(12) United States Patent
Lin et al.

(10) Patent No.: US 6,780,223 B2
(45) Date of Patent: Aug. 24, 2004

(54) METHOD AND APPARATUS FOR TREATING AN EXHAUST GAS CONTAINING VOLATILE ORGANIC COMPOUNDS

(75) Inventors: Shu-Sung Lin, Taipei (TW); Hsin-Hsien Wu, Yunlin (TW); Ching-Chih Lai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 50 days.

(21) Appl. No.: 10/197,811

(22) Filed: Jul. 19, 2002

(65) Prior Publication Data

US 2003/0094099 A1 May 22, 2003

(30) Foreign Application Priority Data

Sep. 14, 2001 (TW) .......................... 90122838 A

(51) Int. Cl.[7] .............................................. B01D 53/14
(52) U.S. Cl. ............................. 95/156; 95/187; 95/237; 96/234; 96/235
(58) Field of Search ...................... 96/234, 235; 95/195, 95/188, 189, 190, 156, 187, 205, 206, 237

(56) References Cited

U.S. PATENT DOCUMENTS

| | | | | |
|---|---|---|---|---|
| 3,778,968 A | * | 12/1973 | Parker, Sr. ....................... | 95/15 |
| 3,914,115 A | * | 10/1975 | Parker, Sr. ..................... | 95/206 |
| 4,102,983 A | * | 7/1978 | Yamase et al. ................ | 95/193 |
| 4,263,019 A | * | 4/1981 | Minkkinen .................... | 95/190 |
| 4,528,001 A | * | 7/1985 | Yokogawa et al. ........... | 95/190 |
| 4,863,495 A | * | 9/1989 | Rafson .......................... | 95/206 |
| 4,871,450 A | * | 10/1989 | Goodrich et al. ............ | 210/151 |
| 5,017,351 A | * | 5/1991 | Rafson ...................... | 423/245.2 |
| 5,122,165 A | * | 6/1992 | Wang et al. .................... | 95/92 |
| 5,198,000 A | * | 3/1993 | Grasso et al. .................. | 95/14 |
| 5,330,563 A | * | 7/1994 | Yamase et al. ................ | 95/163 |
| 5,529,612 A | * | 6/1996 | Troost .......................... | 95/184 |
| 5,637,231 A | | 6/1997 | Hill et al. | |
| 5,851,407 A | | 12/1998 | Bowman et al. | |
| 5,989,439 A | | 11/1999 | Persinger | |
| 6,015,451 A | * | 1/2000 | Anderson et al. ............. | 95/184 |
| 6,280,696 B1 | * | 8/2001 | Hsu et al. ................. | 423/245.1 |
| 6,475,266 B2 | * | 11/2002 | Hayashi et al. ............... | 95/184 |
| 2003/0094099 A1 | * | 5/2003 | Lin et al. ...................... | 95/149 |

FOREIGN PATENT DOCUMENTS

| | | |
|---|---|---|
| EP | 0495707 | 11/1994 |
| EP | 0791101 | 5/1996 |
| EP | 0859746 | 4/1997 |

* cited by examiner

Primary Examiner—Duane S. Smith
(74) Attorney, Agent, or Firm—Birch, Stewart, Kolasch & Birch, LLP

(57) ABSTRACT

A method and apparatus for treating an exhaust gas containing volatile organic compounds. The method includes the steps of: introducing an exhaust gas into a wet scrubber, so that the organic pollutants in the exhaust gas are absorbed by a scrubbing water; pumping the scrubbing water containing the organic pollutants into at least one oxidation tank, thereby causing oxidation reaction between the organic pollutants and an oxidizing agents containing ozone; and introducing the scrubbing water after the oxidation reaction into the wet scrubber. The oxidizing agent further comprises hydrogen peroxide.

24 Claims, 3 Drawing Sheets

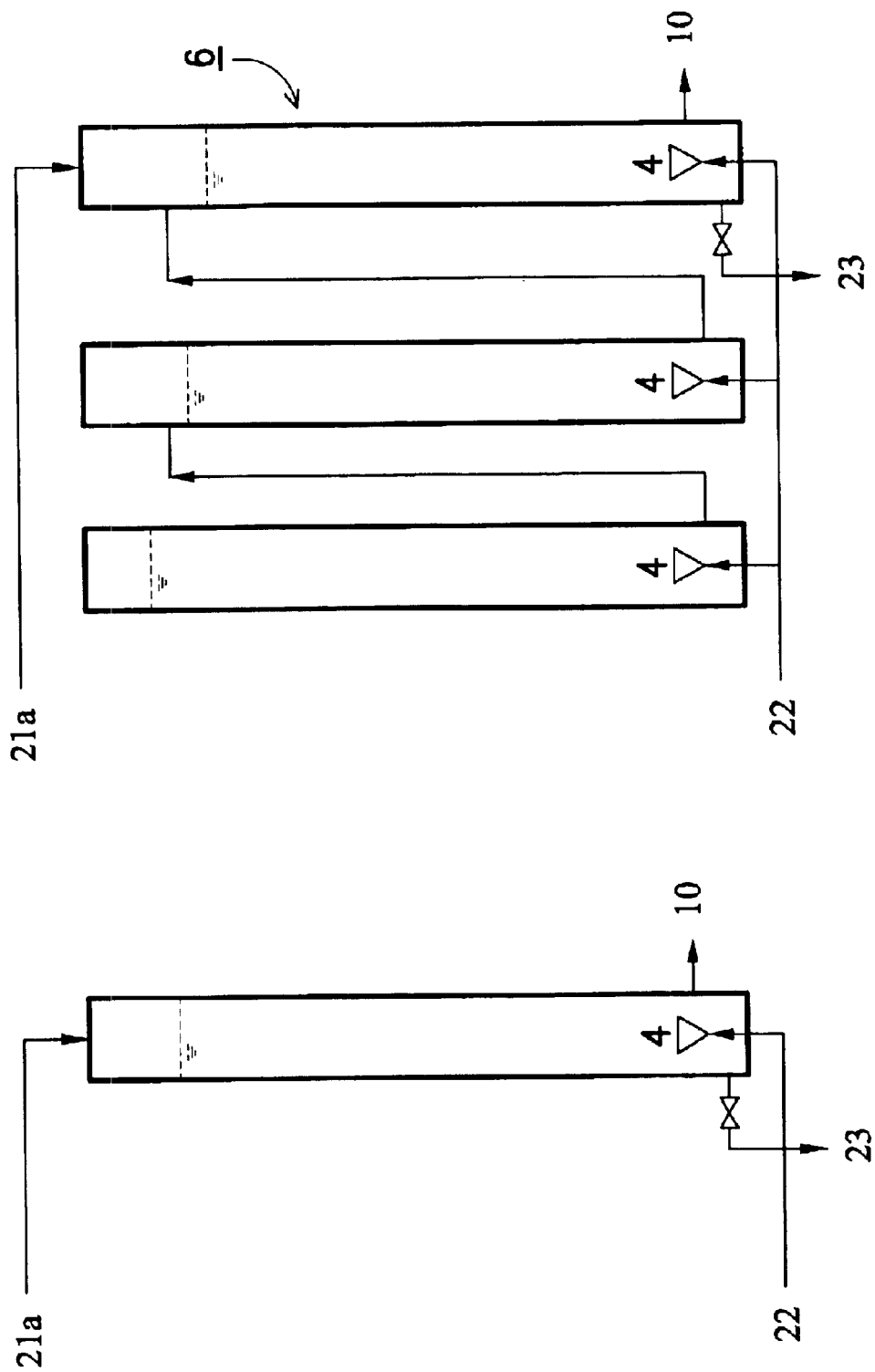

METHOD AND APPARATUS FOR TREATING AN EXHAUST GAS CONTAINING VOLATILE ORGANIC COMPOUNDS

BACKGROUND OF THE INVENTION

1. Field of the Invention

The present invention relates to a method and apparatus for treating an exhaust gas with organic compounds and more particularly, a method and apparatus for treating an exhaust gas containing volatile organic compounds (VOCs).

2. Description of the Prior Art

In semiconductor or liquid crystal display fabrication processes, exhaust gas discharged often contains large amounts of volatile organic compounds, such as isopropyl alcohol (IPA), acetone, methyl ethyl ketone (MEK) and the compounds with high boiling points (for example, dimethylacetamide, DMSO, NMP etc).

Presently, commercial technology for treating exhaust gas containing VOCs from a semiconductor fabrication process are mainly: rotary concentration followed by incineration, activated carbon adsorption and wet scrubber. A large amount of energy is consumed by the rotary concentration followed by incineration, while frequent replacement of activated carbon is required for the activated carbon adsorption, thereby increasing operation costs for both processes. Furthermore, it is observed that the removal efficiency of VOC in an exhaust gas gradually is reduced by the high boiling point compounds (such as the major component of the stripper when the rotary concentration followed by incineration is used. This is because the adsorption ability of the adsorption material used in rotary concentration demolishes, which brings about further decreases of the process efficiency for treating pollutants.

High boiling point substances used in the semiconductor industry are all water soluble, and hence they can be removed by wet scrubber. The wet scrubber transfers the VOC in an exhaust gas to liquid phase by the scrubbing liquid. However, large amounts of clean water are required to maintain high process efficiency, creating even more problems when water shortage and water pollution are not yet resolved in the semiconductor industry.

Conventionally, oxidizing agents are directly added in the wet scrubber for removing organic compounds in the scrubbing liquid, wherein the oxidizing agents will easily escape into the exhaust gas through the scrubber and the utilization of the agent is also low. These result in unwanted secondary pollution. When the reaction rate of the oxidizing agent with the pollutants is slow, process efficiency is decreased.

Ozone exhibits excellent oxidation capability among the commercially avialable oxidizing agents. However, it is commonly used in water supply system and chemical processes, due to high production costs. The majority of ozone application in the field of air pollution treatment mainly focus on the labortary research. The actual engineering application for air pollution is very limited. Prior art related to the use of ozone in treating water and wastewater is found in EP 0859746, EP 0791101, EP0495707, U.S. Pat. Nos. 53,645,377, 5,851,407, and 5,637,231 etc. The use of ozone to treat water and wastewater mainly involves disinfection, or removal of some organic substances as a pretreatment for the follow-up process. Hence, high removal efficiency for organic substances is not required. Conventional ozone reactors are designed as a single reactor combined with an aeration tank, without controlling the water quality, such as pH and bicarbonate concentration in the water. The removal efficiency for organic substances and the utilization rate of ozone are low, resulting high concentration of residue ozone in exhaust gas. Hence, it is necessary to install an ozone destruction unit at the exhaust gas outlet. In order to increase the efficiency of transporting gas ozone to liquid phase, U.S. Pat. Nos. 5,851,407, 5,637,231, and 5,989,439 disclose a method using high pressure or venturi injector to quickly dissolve gas ozone. However, this causes wastage of ozone when reaction rate of the organic substances with ozone is low. Also, maintenance of the equipment is not simple.

SUMMARY OF THE INVENTION

In order to overcome the above problems, an object of the invention is to provide a method and apparatus for removing VOCs from exhaust gas.

It is another object of the invention to provide a method and apparatus for treating VOCs exhaust gas with lower operational costs.

Another object of the invention is to provide a method and apparatus for treating VOCs exhaust gas that is not affected by high boiling point substances.

Another object of the invention is to provide a method and apparatus for treating exhaust gas that greatly reduces both the amounts of required clean water and wastewater production.

Another object of the invention is to provide a method and apparatus for treating exhaust gas that exhibits high efficiency of VOC removal and ozone gas use.

In order to achieve the above objects, the invention provides an apparatus for treating an exhaust gas containing volatile organic compounds, comprising: a wet scrubber for receiving the exhaust gas thus transporting the organic pollutants in the exhaust gas into a scrubbing water; oxidation unit for receiving the scrubbing water from the wet scrubber, thereby introducing an oxidizing agent containing ozone into the scrubbing water so that oxidation occurs; and a recyling device for recyling the scrubbing water from the oxidation unit to the wet scrubber, where the pollutants in the exhaust gas are absorbed in the scrubbing water.

The invention also provides a method for treating an exhaust gas containing volatile organic compounds, comprising: introducing an exhaust gas into a wet scrubber, so that the organic pollutants in the exhaust gas are absorbed by the scrubbing water; pumping the scrubbing water containing the pollutants into at least one oxidation tank, thereby causing the oxidation of the pollutants and an oxidizing agent containing ozone; and introducing the scrubbing water after the oxidation reaction into the wet scrubber, where steps (a) and (b) are repeated.

A primary feature of the invention is the combination of ozone oxidation and conventional wet scrubbing. In the process for treating exhaust gas provided in this invention, by using highly efficient multiple oxidation reactors and controlled operational conditions, utilization rate of oxidizing agent and removal efficiency for organic pollutants are both improved. Problems such as secondary pollution caused by oxidizing agent and the hindered reaction rate between oxidizing agent and pollutants caused by the increase of bicarbonates are avoided. The method and apparatus provided in the invention are particularly useful in treating exhaust gas from semiconductor and LCD processes which contain VOCs that is highly soluble in water.

BRIEF DESCRIPTION OF THE DRAWINGS

FIGS. 2~5 illustrate various oxidation units of the embodiments according to the invention.

DETAILED DESCRIPTION OF THE INVENTION

The invention proposes an integration of the conventional wet scrubbing and highly effective ozone oxidation to obtain a process for treating exhaust gas containing water-soluble organic and/or noxious components. Water-soluble VOC in the invention are organic compounds easily soluble in water at room temperature/pressure, such as esters, ethers, aldehydes, alcohols, ketones and organic acids. And the so-called noxious components contain nitrogen or sulfur in their molecular structure, which causes commonly known foul-smelling components, such as hydrogen sulfide, mercaptan, methyl mercaptan, ethyl mercaptan, dimethyl sulfide and alike. Examples of nitrogen-containing compounds are ammonia, dimethyl amine, methyl amine and alike.

Figure 1:
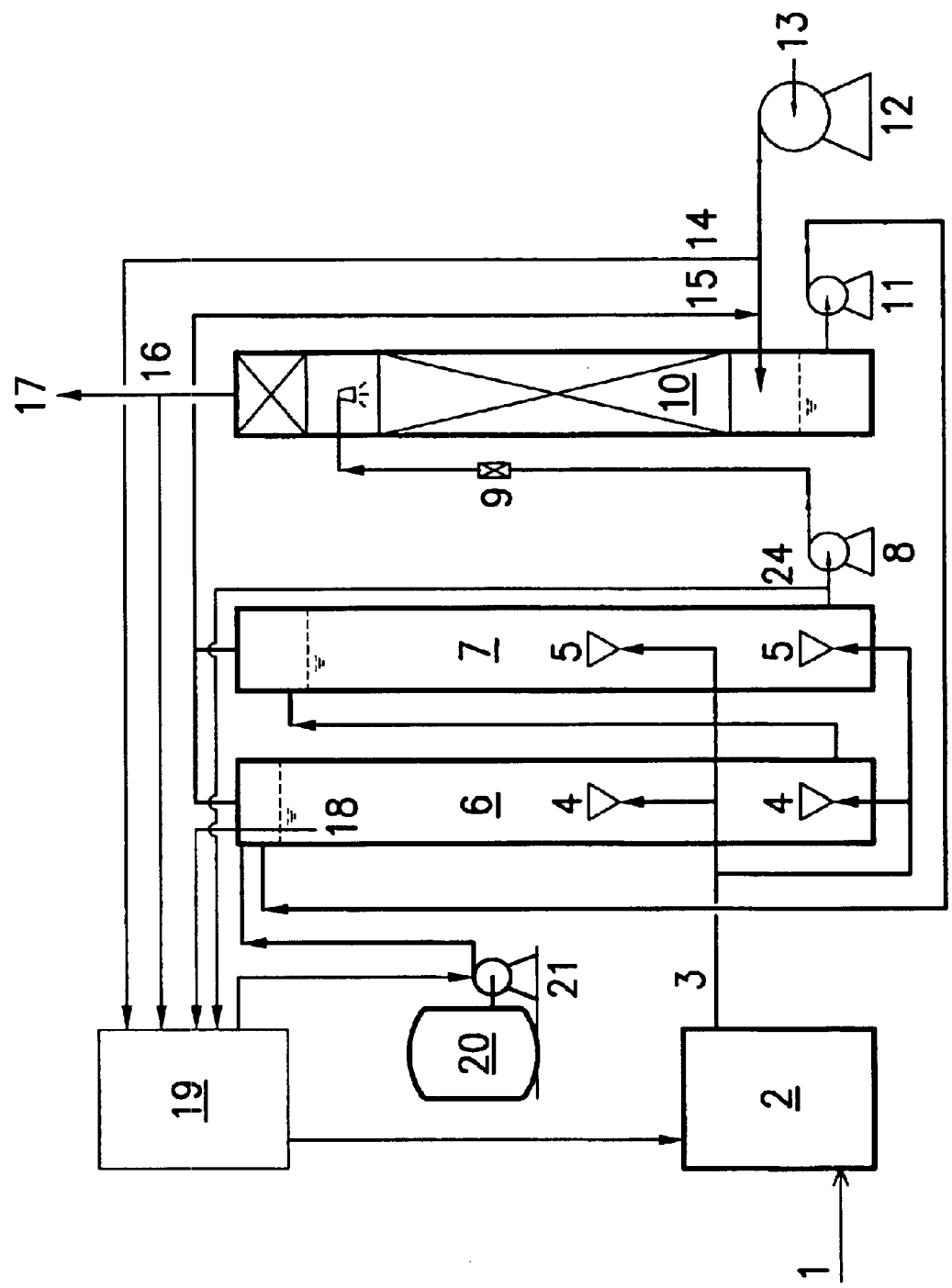
FIG. 1 illustrates the oxidation scrubbing system of the invention.

FIG. 1 shows the method and apparatus of the invention, further explained in detail in the following:

(a) wet scrubber, comprises a chamber 10, spray-nozzle, untreated exhaust gas inflow 13, treated exhaust gas outlet 17, a flowmeter 9 for scrubbing water inflow, a recycling pump 8 for scrubbing water, and low concentration ozone inlet 15 etc. Firstly, the exhaust gas feed is introduced into the wet scrubber chamber 10 so that the organic pollutants in the exhaust gas are transported into the scrubbing water, followed by oxidation with ozone or hydroxyl radicals, wherein the hydroxide radicals are produced by reaction of ozone and hydrogen peroxide or UV light in the scrubbing water. The wet scrubber is a vertical or horizontal packed column, venturi scrubber, or plate tower etc. Depends on the situation, a windmill 12 can be installed in front of the exhaust gas pretreatment inlet, or after the treated exhaust gas outlet.

(b) oxidation unit, for receiving the scrubbing water from the wet scrubber and pumping an oxidizing agent containing ozone into the scrubbing water to cause oxidation. The oxidation unit of the invention comprises at least an oxidation tank (6,7) having a scrubbing water inlet 18 and a scrubbing water outlet 24, and at least an oxidizing agent dispenser mounted on the oxidation tank for pumping ozone into the oxidation tank to cause oxidation of the scrubbing water and the organic pollutants. Next, the scrubbing water is pumped via a recycling pump 11 into the oxidation tank 6,7 to combine with the oxidizing agent, wherein oxidation is carried out and the water quality of the scrubbing water is monitored to maintain a pH value of 8~11. The position for introducing the oxidizing agent is in front of the oxidation tank, and the contact mode of the scrubbing water and oxidizing agent is countercurrent or cocurrent. The oxidizing agent is ozone or ozone with hydrogen peroxide. The tank is either vertical or horizontal, and is comprised of one or more in series. Also, at least one oxidizing agent dispenser 21 is connected with each tank, and the oxidizing agent is stored in an oxidizing agent tank 20. At least an ozone injection unit (4,5) is included to dissolve ozone in the scrubbing water, or a packed column can be used to increase the utilization rate of ozone gas.

(c) Recycling unit 8, for repumping the reacted scrubbing water into the wet scrubber 10 to absorb the pollutants in the exhaust gas.

The apparatus for treating exhaust gas of the invention further comprises an outlet piping (not shown in figures) to transfer some reacted scrubbing water into a wastewater stream which then flows into a wastewater tank (not shown in figure), thereby preventing the system from the increment of produced bicarbonates, which reduces the efficiency of the hydroxide radicals produced by ozone.

In order to monitor and control the concentration of the exhaust gas, process efficiency and the amount of the ozone supplied, the apparatus further comprises a monitoring system 19 for scrubbing water quality and exhaust gas. Monitoring of the inlet concentration of the exhaust gas and process efficiency takes place at the exhaust gas inlet 14 of the wet scrubber and the exhaust gas outlet 16. Monitoring the water quality of the scrubbing water preferably takes place at the scrubbing water inlet 18 and outlet 24 of the oxidation tank. An additive (including hydrogen peroxide, sodium hydroxide) dispenser 21, and additive storage tank 20 are included to adjust the scrubbing water quality. An oxidizing agent supply system 2 provides the oxidizing agent, wherein air is fed via oxygen inlet 1 into the ozone producer 2, and 3 represents the ozone inlet into the oxidation unit. The amount of the oxidizing agent supplied varies based on the inlet and outlet VOC concentrations of the exhaust gas and the value of the predetermined removal efficiency. The amount of the oxidizing agent should be increased when the inlet VOC concentration increases or when the efficiency is lowered, and the amount of the oxidizing agent should be decreased when the inlet VOC concentration is reduced or when the efficiency is increased.

Figure 5:
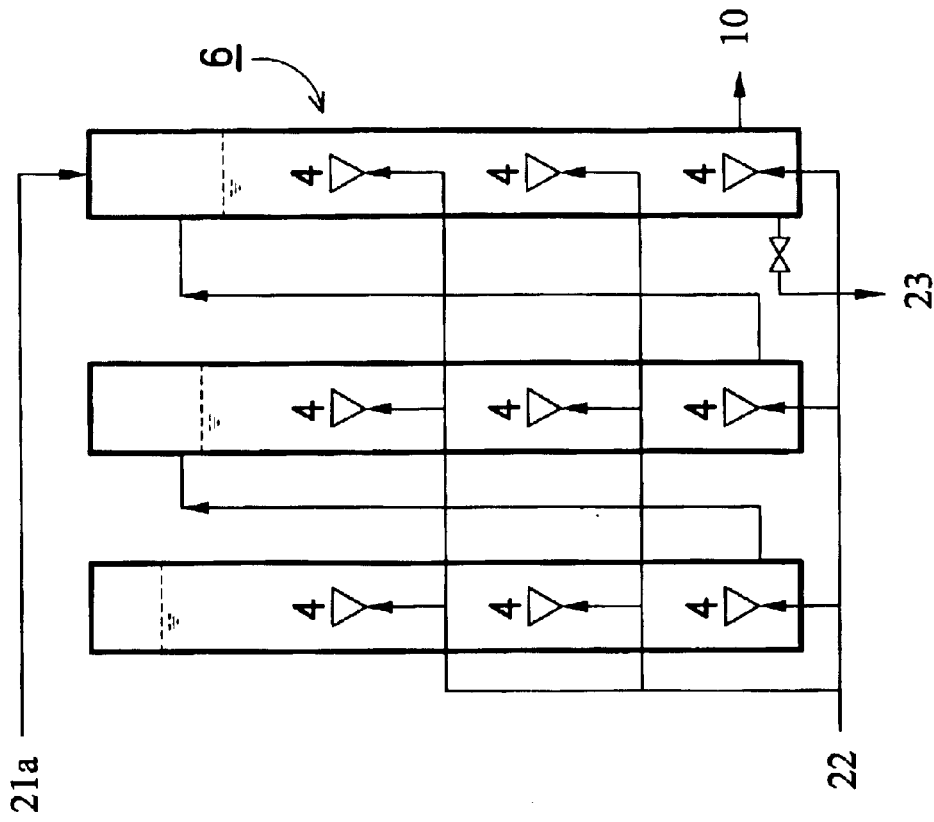
Figure 4:
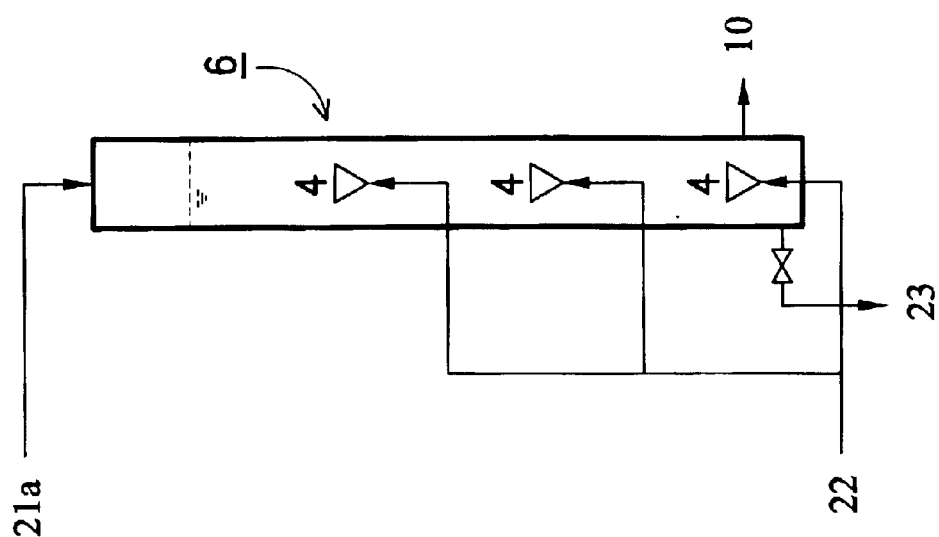

The number of oxidation tanks or the methods for introducing the oxidizing agent are designed based on the charaterstics of exhaust gas. For instance, when the removal efficiency of the pollutants in the exhaust gas and the oxidizing agent is not high, i.e. less than 80%, the tank can be a single tank with a single dispenser for oxidizing agent. When higher removal efficiency is required, multiple oxidation tanks in series are preferred. A number of dispensers for oxidizing agent can also be installed on a single oxidation tank. Examples of various designs are shown in FIGS. 2~5, where 21a represents the additive dispenser, 10 represents the wet scrubber, 22 represents the oxidizing agent producing unit, and 23 represents wastewater stream. FIG. 2 illustrates a single oxidation dispenser with a single oxidation tank. FIG. 3 illustrates a single oxidation dispenser with multiple oxidation tanks. FIG. 4 illustrates multiple oxidation dispensers with a single oxidation tank. FIG. 5 illustrates multiple oxidation dispensers with multiple oxidation tanks. The retention time, according to the invention, is preferably 2~10 minutes in each oxidation tank or each section of the oxidation tanks.

In comparison to the current technology for treating exhaust gas, advantages of the invention are as follows:

1. Problems such as blocking of high boiling point compounds and explosion when using the method of condensation followed by incineration (major trend of the current semiconductor industry) are avoided.
2. Recycling of scrubbing water helps to prevent the large quantities of effluent produced in conventional methods, which consequently improves the process efficiency, economic benefits, scope of application and control methods of the conventional wet scrubbing technology for treating exhaust gas and noxious gas.
3. Using $O_3$ as the oxidizing agent to promote oxidation capability, and having oxidation and scrubbing performed separately assists the effective use of the oxidizing agent and increase of removal efficiency for treating exhaust gas containing VOCs. Conventional oxidation/scrubbing processes for treating organic compounds are therefore improved.

4. Multiple $O_3$ oxidation tanks are designed based on the reaction rate of ozone with the organic compounds present in the exhaust gas and the amount of ozone transported from gas phase to liquid phase so that the traditional utilization rate of $O_3$ is enhanced. No pressurizing devices are required when operated under normal pressure. Easy design and maintenance of the tanks are also achieved.

5. The operational parameter (pH value) is controlled so that OH radicals produced during the reaction are increased, consequently increasing the initial oxidation capability and process efficiency of current methods.

6. Frequency of replacement of the scrubbing water in the invention is controlled to lower the interference of bicarbonates, which in turn increases the efficiency of the hydroxide radicals produced by ozone. Removal efficiency is thereby improved.

7. The invention features an integration of conventional wet scrubber, multi-section $O_3$ oxidation tank and the control of operating parameters to enhance the oxidation efficiency and to provide equipment that requires less ground space. Exhaust gas to be processed is absorbed by the recycling scrubbing water in the wet scrubber. And those easily soluble pollutants are oxidized and removed by the oxidizing agent in the oxidation tank. In addition, pH control is utilized to enhance removal efficiency of VOC and the utilization rate of the oxidizing agent. Other than the above-mentioned chemical reactions provided in the effective oxidation tank, monitoring and adjustment of the water quality of the scrubbing water pumped into the oxidation tank are also acquired. The invention also provides a method utilizing system control to increase the utilization rate of the oxidizing agent and the removal efficiency for the organic pollutants.

Preferred Embodiments

Embodiments of the invention mainly deal with exhaust gas containing VOC from a semiconductor process. Major components of the exhaust gas from semiconductor fab A are PGME, MEK and IPA, and the total hydrocarbon concentration thereof is about 100~700 ppmv as methane. Charactersics of the exhaust gas from semiconductor fab B, however, is photoresist stripping agent, with dimethyl sulfoxide (DMSO) as the major component, and the total hydrocarbon concentration is about 35 ppmv as methane. $O_3$ is used as the oxidizing agent. Layout of the oxidation tank and ozone injection system for testing exhaust gas from semiconductor fab A is in a single phase, while the oxidation tank and ozone injection means are in two phases for fab B. Experimental conditions and results are listed in Table 1.

Table 2 lists the comparison of removal efficiency for the organic pollutants in the exhaust gas for a long period of time between the invention and the conventional wet scrubbing technique.

TABLE 2

| Source of exhaust gas | average process efficiency of the invention | average process efficiency of the conventional wet scrubbing |
|---|---|---|
| Fab A | 73% | 30% |
| Fab B | 85% | 10% |

Note: Water is used as the sole absorption agent without any additives.

Table 3 is a list of the comparison of the removal efficiency for exhaust gas from Fab A having different pH values of the scrubbing water.

TABLE 3

| pH value | 7 | 10 |
|---|---|---|
| process efficiency | 30% | 73% |

Table 4 lists the comparison of the concentrations of bicarbonates in the water and removal efficiency for exhaust gas from Fab A using different frequencies of replacement of the scrubbing water.

TABLE 4

| Frequency of Replacement of scrubbing water | 60 L/day | 180 L/day |
|---|---|---|
| Bicarbonate | 600 ppm | 100 ppm |
| Removal efficiency | 52% | 73% |

Table 5 lists the concentration of $O_3$ at the exhaust gas process outlet and the utilization rates of $O_3$ according to the invention and the conventional technique utilizing ozone oxidation in a long operation.

TABLE 5

| | Present Invention | Conventional $O_3$ oxidation |
|---|---|---|
| Concentration of bicarbonates | 0.03 ppmv | 3000 ppmv |
| Process Efficiency | >99.9% | 90% |

Note: The inlet concentration of the ozone is 30000 ppmv.

The foregoing description of the preferred embodiments of this invention has been presented for purposes of illustration and description. Obvious modifications or variations are possible in light of the above teaching. The embodiments

TABLE 1

| Source of exhaust gas | Layout of the oxidation tank | Amount of ozone supplied (g/hr) | Amount of $H_2O_2$ supplied (g/hr) | Amount of wind processed (CMM) | Average concentration after process (ppmv) | Average concentration before process (ppmv) | Average process efficiency |
|---|---|---|---|---|---|---|---|
| Fab A | single phase | 30 | 0 | 0.7 | 31 | 115 | 73% |
| Fab A | single phase | 7 | 1.4 | 1.4 | 74 | 187 | 60% |
| Fab B | two phases | 3 | 0.3 | 1.7 | 4.3 | 28.8 | 85% |

What is claimed is:

1. An apparatus for treating an exhaust gas containing volatile organic compounds, comprising:
   (a) a wet scrubber for receiving the exhaust gas, and transporting organic pollutants in the exhaust gas into a scrubbing water;
   (b) oxidation unit for receiving the scrubbing water from the wet scrubber, thereby introducing an oxidizing agent containing ozone and hydrogen peroxide into the scrubbing water to cause oxidation reaction; and
   (c) a recycling device for recycling the scrubbing water from the oxidation unit to the wet scrubber so that the scrubbing water absorbs organic pollutants in the exhaust gas.

2. The apparatus as claimed in claim 1, wherein the scrubber is vertical or horizontal.

3. The apparatus as claimed in claim 1, wherein the contact mode of the exhaust gas and the scrubbing water is countercurrent or cocurrent.

4. The apparatus as claimed in claim 1 further comprising an additive dispenser for introducing an additive into the oxidation unit thereby maintaining the pH value of the scrubbing water at 8~11.

5. The apparatus as claimed in claim 1, wherein the oxidation unit is comprised of at least one oxidation tank, and the oxidation tank is comprised of at least an inlet for introducing oxidizing agent.

6. The apparatus as claimed in claim 1, wherein the oxidation unit is set up by two or more oxidation tanks in series.

7. The apparatus as claimed in claim 1, wherein the hydraulic retention time of the scrubbing water in each oxidation tank is from 2 to 10 minutes.

8. The apparatus as claimed in claim 1, further comprising an outlet piping for draining the scrubbing water out of the apparatus.

9. The apparatus as claimed in claim 1, further comprising a monitoring system for observing the treatment of the exhaust gas.

10. The apparatus as claimed in claim 1, wherein the organic pollutants in the exhaust gas are esters, ethers, aldehydes, alcohols, ketones or organic acids.

11. The apparatus as claimed in claim 1, wherein the exhaust gas further comprises noxious components having molecular structures with nitrogen or sulfur.

12. The apparatus as claimed in claim 1, wherein the exhaust gas is released from semiconductor or LCD processes.

13. A method for treating an exhaust gas containing volatile organic compounds, comprising:
   (a) introducing the exhaust gas into a wet scrubber, wherein organic pollutants in the exhaust gas are absorbed by a scrubbing water;
   (b) pumping the scrubbing water containing the organic pollutants into at least one oxidation tank, thereby causing oxidation reaction between the organic pollutants and an oxidizing agent containing ozone and hydrogen peroxide; and
   (c) introducing the scrubbing water after the oxidation reaction into the wet scrubber, and repeating steps (a) and (b).

14. The method as claimed in claim 13, wherein the organic pollutants in the exhaust gas are esters, ethers, aldehydes, alcohols, ketones or organic acids.

15. The method as claimed in claim 13, wherein the exhaust gas further comprises noxious components having molecular structures with nitrogen or sulfur.

16. The method as claimed in claim 13, wherein the contact mode of the exhaust gas and the scrubbing water is countercurrent or cocurrent.

17. The method as claimed in claim 13, wherein in step (b), the pH value of the scrubbing water is maintained at 8~11.

18. The method as claimed in claim 13, wherein at least one inlet for introducing oxidizing agent is mounted on the oxidation tank.

19. The method as claimed in claim 13, wherein the oxidation tank is set up by two or more oxidation tanks in series.

20. The method as claimed in claim 13, wherein the hydraulic retention time of the scrubbing water in each oxidation tank is from 2 to 10 minutes.

21. The method as claimed in claim 13, wherein step (c) further comprises draining some of the scrubbing water out of the oxidation tank.

22. The method as claimed in claim 13, wherein the exhaust gas is released from semiconductor or LCD processes.

23. An apparatus for treating an exhaust gas containing volatile organic compounds, comprising:
   (i) a wet scrubber for receiving the exhaust gas, and transporting organic pollutants in the exhaust gas into a scrubbing water;
   (ii) oxidation unit set up by two or more oxidation tanks in series for receiving the scrubbing water from the wet scrubber, thereby introducing an oxidizing agent containing ozone into the scrubbing water to cause oxidation reaction; and
   (iii) a recycling device for recycling the scrubbing water from the oxidation unit to the wet scrubber so that the scrubbing water absorbs organic pollutants in the exhaust gas.

24. The apparatus as claimed in claim 23, further comprising a monitoring system for observing the treatment of the exhaust gas.

* * * * *